US008100756B2

(12) United States Patent
O'Rourke et al.

(10) Patent No.: US 8,100,756 B2
(45) Date of Patent: Jan. 24, 2012

(54) DYNAMIC PROBLEM SOLVING FOR GAMES

(75) Inventors: Bret P. O'Rourke, Kirkland, WA (US);
Eric P. Wilfrid, Mountain View, CA (US); Nigel S. Keam, Redmond, WA (US); Steven Bathiche, Kirkland, WA (US); James M. Alkove, Bellevue, WA (US); Zachary L. Russell, Bellevue, WA (US); Jon Marcus Randall Whitten, Sammamish, WA (US); Boyd C. Multerer, Redmond, WA (US); Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 943 days.

(21) Appl. No.: 11/864,609

(22) Filed: Sep. 28, 2007

(65) Prior Publication Data

US 2009/0088233 A1    Apr. 2, 2009

(51) Int. Cl.
*A63F 9/24* (2006.01)
(52) U.S. Cl. ........................................................ 463/23
(58) Field of Classification Search .................. 463/23
See application file for complete search history.

(56) References Cited

U.S. PATENT DOCUMENTS

| 6,257,982 | B1 | 7/2001 | Rider et al. |
|---|---|---|---|
| 6,575,831 | B1 * | 6/2003 | Gonen et al. ................... 463/25 |
| 2001/0049084 | A1 | 12/2001 | Mitry |
| 2004/0005924 | A1 * | 1/2004 | Watabe et al. .................. 463/36 |
| 2005/0119052 | A1 | 6/2005 | Russell et al. |
| 2005/0215311 | A1 | 9/2005 | Hornik et al. |
| 2006/0068893 | A1 | 3/2006 | Jaffe et al. |
| 2006/0287106 | A1 | 12/2006 | Jensen |
| 2007/0060295 | A1 | 3/2007 | DeMar et al. |
| 2007/0117614 | A1 | 5/2007 | Duhamel |

OTHER PUBLICATIONS

Zsolt Szalavari, et al. Collaborative Gaming in Augmented Reality. ACM 1-58113-019-8/98/0011. Taipei, Taiwan, Nov. 2-5, 1998. VRST '98. http://delivery.acm.org/10.1145/300000/293740/p195-szalavari.pdf?key1=293740&key2=5427767811&coll=GUIDE&dl=GUIDE&CFID=27308196&CFTOKEN=58392085. Last accessed Aug. 22, 2007, 10 pages.

Matthew Chalmers, et al. Gaming on the Edge: Using Seams in Pervasive Games. http://www.pervasive.ifi.Imu.de/workshops/w3/papers_2005/PerGames2005.pdf. Last accessed Aug. 22, 2007, 8 pages.

Douglas P. Twitchell. StrikeCOM: A Multi-Player Online Strategy Game for Researching and Teaching Group Dynamics http://www.cmi.arizona.edu/pubs/Twitchell-HICSS-StrikeCOM.pdf. Last accessed Aug. 22, 2007, 9 pages.

\* cited by examiner

*Primary Examiner* — Corbett B Coburn
(74) *Attorney, Agent, or Firm* — Lee & Hayes, PLLC

(57) ABSTRACT

A system that facilitates enhancing a game, game play or playability of a game may include an experience component, a game component and an alteration component. The experience component can collect a portion of data related to a game in which the portion of data indicates at least one of a tip or a tactic for the game. The game component can dynamically incorporate the portion of data into the game during game play to enhance playability of such game for a user with assistance provided by at least one of the tip or the tactic. The alteration component may alter the game during game play.

26 Claims, 10 Drawing Sheets

DYNAMIC PROBLEM SOLVING FOR GAMES

BACKGROUND

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting information and gathering, etc. For example, a computing system interfaced to the Internet, by way of wire or wireless technology, can provide a user with a channel for nearly instantaneous access to a wealth of information from a repository of web sites and servers located around the world. Such a system, as well, allows a user to not only gather information, but also to provide information to disparate sources. As such, online data storing and management has become increasingly popular.

Furthermore, computer-related gaming has risen dramatically in interest and popularity. This may be due in large part to the accessibility or availability of games. For example, the online computer gaming business has skyrocketed to a multi-billion dollar industry, with no end in sight, thereby providing a form of leisure activity for millions of users while also providing a boom to companies involved in such an industry. Generally, many different types of games can be downloaded or played on just about any type of computing device regardless of size. As a result of increasing demands and consumer expectations, game developers are constantly trying to produce more creative gaming systems/devices that present higher quality graphics, more realistic character appearance and movements, and/or different types of challenge scenarios or obstacles for the user.

The gaming industry has followed technological advances and have quickly adapted to online access and/or online playability. For instance, games typically involve virtual world interaction between players, wherein the user/player purchases the client version of the game which thereafter can provide access to Internet servers supporting multiplayer mode gaming with other Internet users. In another example, games can be mixed physical world-virtual world (or physical-virtual) gaming. Such gaming can be a nascent social technology in which participants play a mobile game in physical space that is tied in some way to a virtual world component. Regardless of game type, gaming console, gaming system, gaming format, etc., users/players typically come across hurdles and/or difficulties within the game that can be frustrating to overcome. Although games aim to challenge consumers (e.g., players, users, etc.), such challenges can be frustrating if too difficult for users/players with lower skill levels. Developing a game with a skill level applicable to a high number of consumers can be complex and costly especially without compromising the desired level of difficulty.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate incorporating a portion of data into a game during game play to enhance playability. A game component can provide potential solutions to gaming problems and situations. In particular, an experience component can collect data related to suggestions, tips, tactics, corporate hints, etc. which relate to a particular problem/puzzle/hurdle within a game. Moreover, the game component can incorporate data based upon a user's expertise and/or skill level. Generally, the experience component can collect and/or identify data from a network, wherein such data can relate to useful information for a game. The game component can dynamically incorporate such collected data into the game during game play to enhance playability.

In accordance with an aspect of the subject innovation, an alteration component can be employed to allow for collaborative and dynamic alterations to a game and its potential outcomes based at least in part upon the data collected. For example, a collective group can suggest an alternative ending to a game upon completion. Thus, games can evolve based upon the collective desires or aspirations of a group. In another aspect, the game component can utilize a real time component that can incorporate real time events into a game play for a game. By leveraging a network, the experience component can collect real time data events such as news stories, weather, political news, etc. and incorporate such information into the game. For instance, if weather for a user is sunny, the weather data in the game can be enhanced to become sunny.

In accordance with still another aspect of the claimed innovation, a reward component can implement performance-based incentives. Such incentives can be based upon performance, participation for contribution, peer review, creation, participation within a network to collect useful information for a game, etc. In another aspect, a generator can gather content selected from various games to reassemble and create new games based on the aggregated data. In other aspects of the claimed subject matter, methods are provided that facilitate employing a dynamic and interactive experience with a game by leveraging a network.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
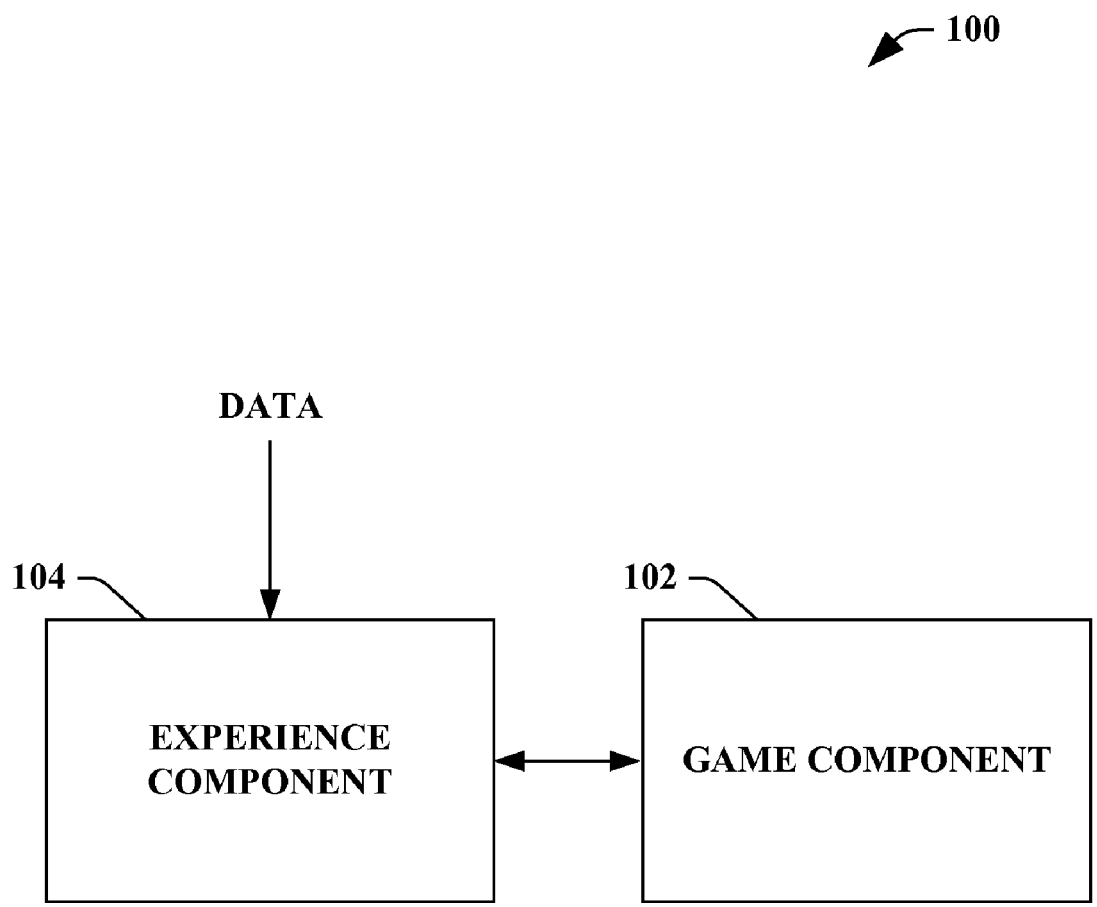
FIG. 1 illustrates a block diagram of an exemplary system that facilitates incorporating a portion of data into a game during game play to enhance playability.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "device," "console," "generator," "network," "game," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates incorporating a portion of data into a game during game play to enhance playability. The system 100 can include a game component 102 that can dynamically incorporate data into a game during game play in order to enhance user interaction, experience, and overall playability. Moreover, an experience component 104 can receive a portion of data related to a game, wherein such portion of data can be associated with a tip, a past experience/situation, a tactic, a suggestion, a nuance, a technique, a solution, an adjustment, and/or any other portion of data that can be useful for a user interacting with a game. The game component 102 can utilize the portion of data gathered by the experience component 104 in order to incorporate such portion of data into game play in real time. In other words, the game component 102 can enhance playability of a game based upon offering advice and/or assistance during game play in real time so as to ensure a user and/or player does not become frustrated or discouraged. Although conventional games provide in-game tips/suggestions, such information is coded into the game prior to discovery of more useful techniques, secrets, hints, tactics, etc. that turn up from user/player practice.

It is to be appreciated that the experience component 104 can identify any suitable data that can assist in game play or playability for a game. For example, the experience component 104 can collect data related to game A from user B in which user B located a secret at a particular point in the game. During game play, the system 100 can inform user C of such secret at such particular point in the game in real time. Thus, although the information from user B (e.g., the secret, hint, tip, etc.) can be collected by the experience component 104 at a previous moment in time, the information related to the secret can be dynamically incorporated into the game for user C to assist in locating such secret. In other words, the system 100 can identify a situation related to an instant in a game, in which the game component 102 can dynamically provide a portion of data related to such instant (gathered by the experience component 104) to a user/player during such situation in the game. It is to be appreciated and understood that the game component 102 can employ various security techniques in order to verify the validity and/or accuracy of such data collected by the experience component 104.

The system 100 can be implemented with a plurality of games independent of format, platform, console, vendor, maker, etc. In general, the system 100 can dynamically incorporate such data into any suitable game, gaming system, gaming device, and the like, in which such game, console, system, etc. includes connectivity to a network (discussed below) to receive a portion of data. For example, it is to be appreciated and understood that the game can be at least one of a computer game, a video game, a personal computer game, a role-playing game, a virtual world game, a game associated with a genre (e.g., first person game, an action game, a racing game, a fighting game, a strategy game, a puzzle game, a board game, a card game, a sport game, etc.), a hand held game, a game related to a hand held device, and/or any suitable game with Internet capabilities to receive a portion of data collected by the experience component 104. Generally, a game can be any interactive experience such as, but is not limited to, a competitive activity involving at least one of skill, chance, or endurance on the part of one or more individuals who play according to a set of rules, usually for their own amusement or for that of spectators.

Figure 2:
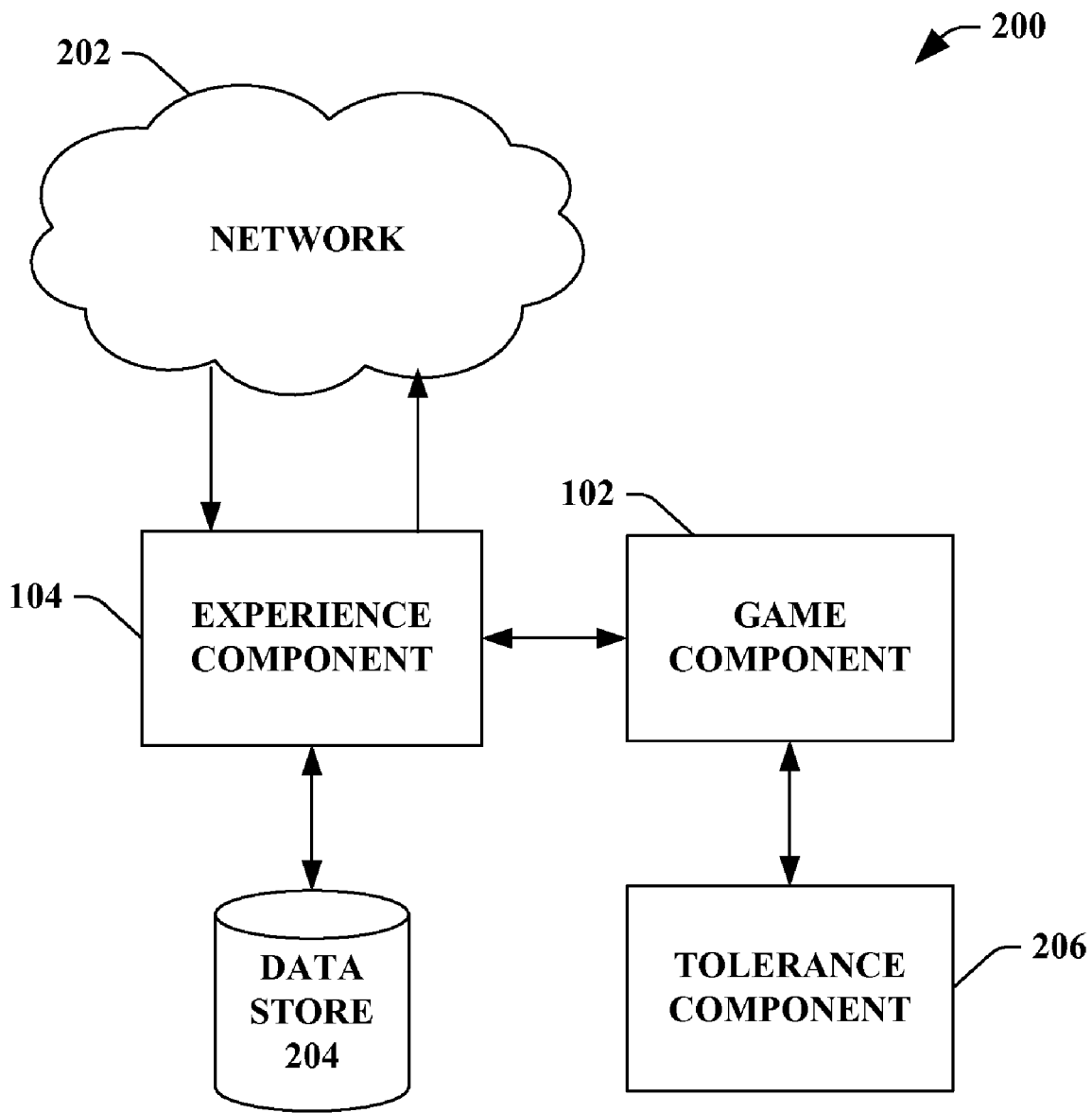
FIG. 2 illustrates a block diagram of an exemplary system that facilitates collecting game related data from a network to optimize game play for a user.

FIG. 2 illustrates a system 200 that facilitates collecting game related data from a network to optimize game play for a user. The system 200 can include the game component 102 that can employ a portion of data collected by the experience component 104 into a game at a particular instant during game play, wherein the portion of data provides assistance for such particular instant in the game. In other words, the game component 102 can enhance game play for a game by dynamically incorporating helpful portions of data triggered by specific moments and/or instants during game play. By enabling such dynamic problem solving, game difficulty can be increased without complaints and/or worries of deterring and annoying consumers (e.g., users, players, etc.).

For instance, the game component 102 can dynamically communicate a tip for a particular level or scene in a game. Such tip can be gathered by the experience component 104. Furthermore, the system 200 can provide portions of data that correspond to a skill level of a user/player. Thus, a more experienced user/player can receive a more advanced portion of data (e.g., a tip, a past experience/situation, a tactic, a suggestion, a nuance, a technique, a solution, an adjustment, a portion of data that can be useful for a user interacting with a game, etc.), whereas a less experienced user/player can receive a more novice portion of data or advice. It is to be appreciated that the game component 102 can identify a user/player skill level and identify a corresponding portion of data that suits such skill set in order to optimize help or assistance.

The experience component 104 can gather and/or collect portions of data from a network 202. The network 202 can be any suitable data network that can communicate a portion of data related to a game. For instance, the network 202 can be, but is not limited to being, the Internet, a web site, a forum, an email, a web service, a voice over Internet protocol (VoIP) communication, an instant message, a text message, a cellular communication, a voicemail, a computer, a machine, a laptop, a user, a community of users, a portable digital assistant (PDA), a hand held, etc. For instance, the network 202 can be a community of users that provide information and data related to a plurality of games in which the experience component 104 can pool relevant portions of data that can be utilized to assist users/players during game play. It is to be appreciated that the experience component 104 can include numerous filters and/or security techniques in order to validate the network 202, users within the network 202, and data associated with the network 202.

The system 200 can further include a data store 204 that can store any suitable data related to the game component 102, the experience component 104, the network 202, etc. For example, the data store 204 can include, but not limited to including, data related to a game, a tip related to a game, a tactic for a game, a solution for a game, a hint for a game, a suggestion for a game, an alteration to a game, an adjustment to a game, an additional feature to a game, a past experience for a game, a portion of real time data, a portion of data collected from the network 202, data related to a game from a user, data for a game from a corporation, data for a game from a vendor, data for a game from a third-party, data associated with a maker of a game, any suitable data related to a game to offer assistance or improvement, etc.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, and the like.

The system 200 can further include a tolerance component 206 that employs a trigger that initiates dynamic incorporation of the portion of data (e.g., a tip, a past experience/situation, a tactic, a suggestion, a nuance, a technique, a solution, an adjustment, a portion of data that can be useful for a user interacting with a game, etc.). The tolerance component 206 can utilize a trigger based upon, for instance, a duration related to a particular instant (e.g., a time period a user/player is unable to pass/succeed at a point in a game), a skill level related to a player/user, a duration associated with total game play (e.g., a total time a player/user has played the game), rating of the portion of data (e.g., high ranking suggests more users/players desire such portion of data), a difficulty level related to a point in the game (e.g., more apt to provide assistance/suggestions at a harder point in the game), and/or any other suitable characteristic related to the user, game, skill level, or portion of data.

Figure 3:
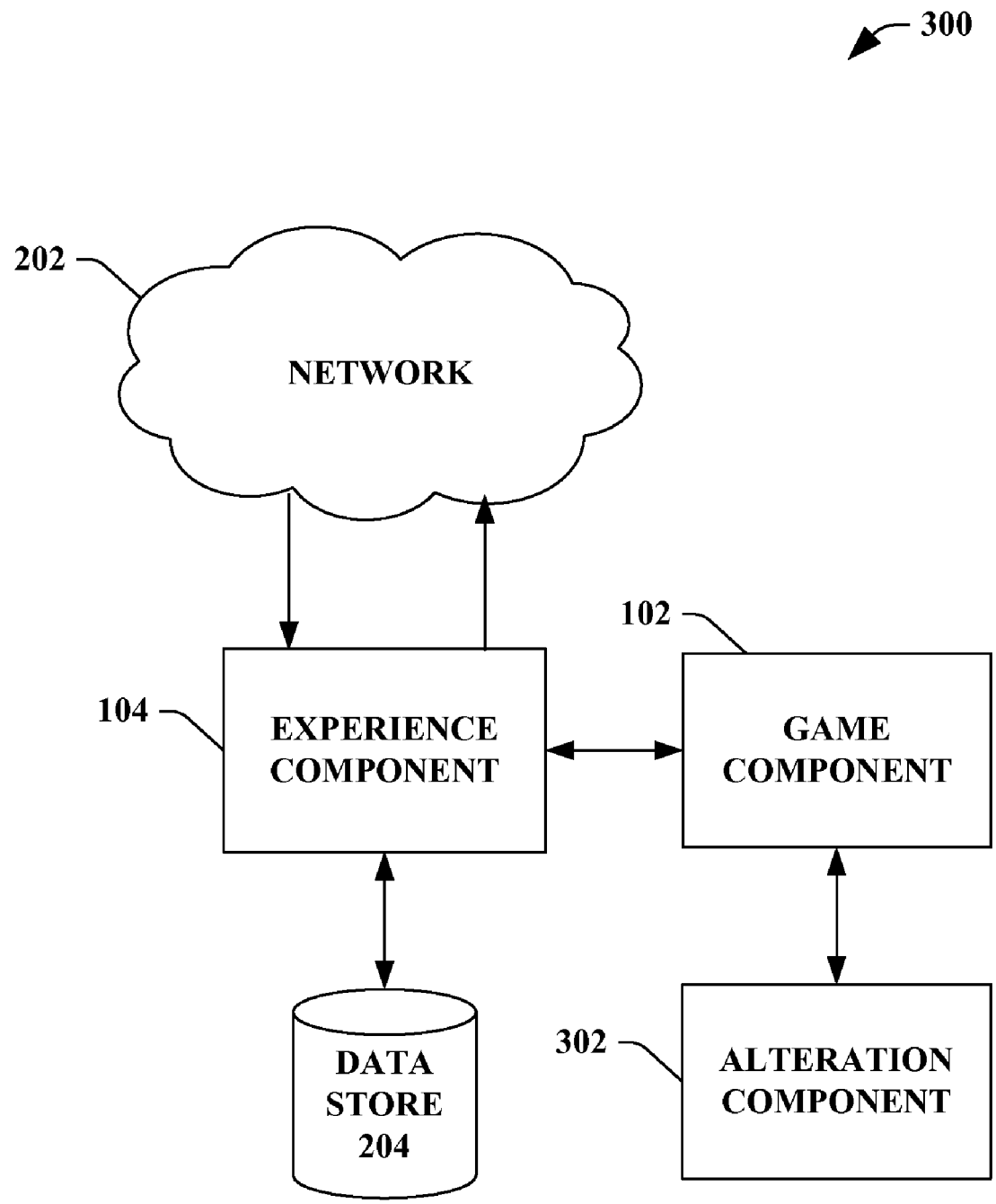
FIG. 3 illustrates a block diagram of an exemplary system that facilitates altering a portion of game play associated with a game utilizing data collected from a network.

FIG. 3 illustrates a system 300 that facilitates altering a portion of game play associated with a game utilizing data collected from a network. The system 300 can include the experience component 104 that can gather a portion of data related to a game from the network to enable the game component 102 to display such portions of data to a user/player during game play in real time. For instance, a user/player in a particular situation within a game can receive a portion of data related to such particular situation in any suitable form (e.g., text data, graphical data, visual data, audio data, etc.) via the system 300, wherein such portion of data provides assistance and/or help to the user/player. Generally, the system 300 provides potential solutions to gaming problems and situations via the experience component 104, in which the experience component 104 gathers data from the network 202 and stores/accesses such data via the data store 204.

The game component 102 can utilize an alteration component 302 that can employ collaborative and dynamic alterations to a game and its potential outcome based at least in part upon the data collected. For example, a collective group can suggest an alternative ending for a game upon completion. Thus, games can evolve based upon the collective desires or aspirations of a user, group, and/or any entity providing information/data to the network 202. In other words, the alteration component 302 can implement the game with a portion of data not originally associated with such game. The alteration component 302 can receive an alteration from any suitable source such as, but not limited to, the network 202, the experience component 104, the data store 204, a user, a corporation, a vendor, a third-party service, evaluation of data collected by the experience component 104, etc. In addition, the alteration can relate to any suitable portion of the game such as, but not limited to, a story line, a character, a rule, a setting, equipment, a control, a difficulty setting, an environment, offline play, game play, online play, network capabilities, a game mode, a portion of graphics, a portion of audio, a portion of video, a portion of user interaction, etc.

Figure 4:
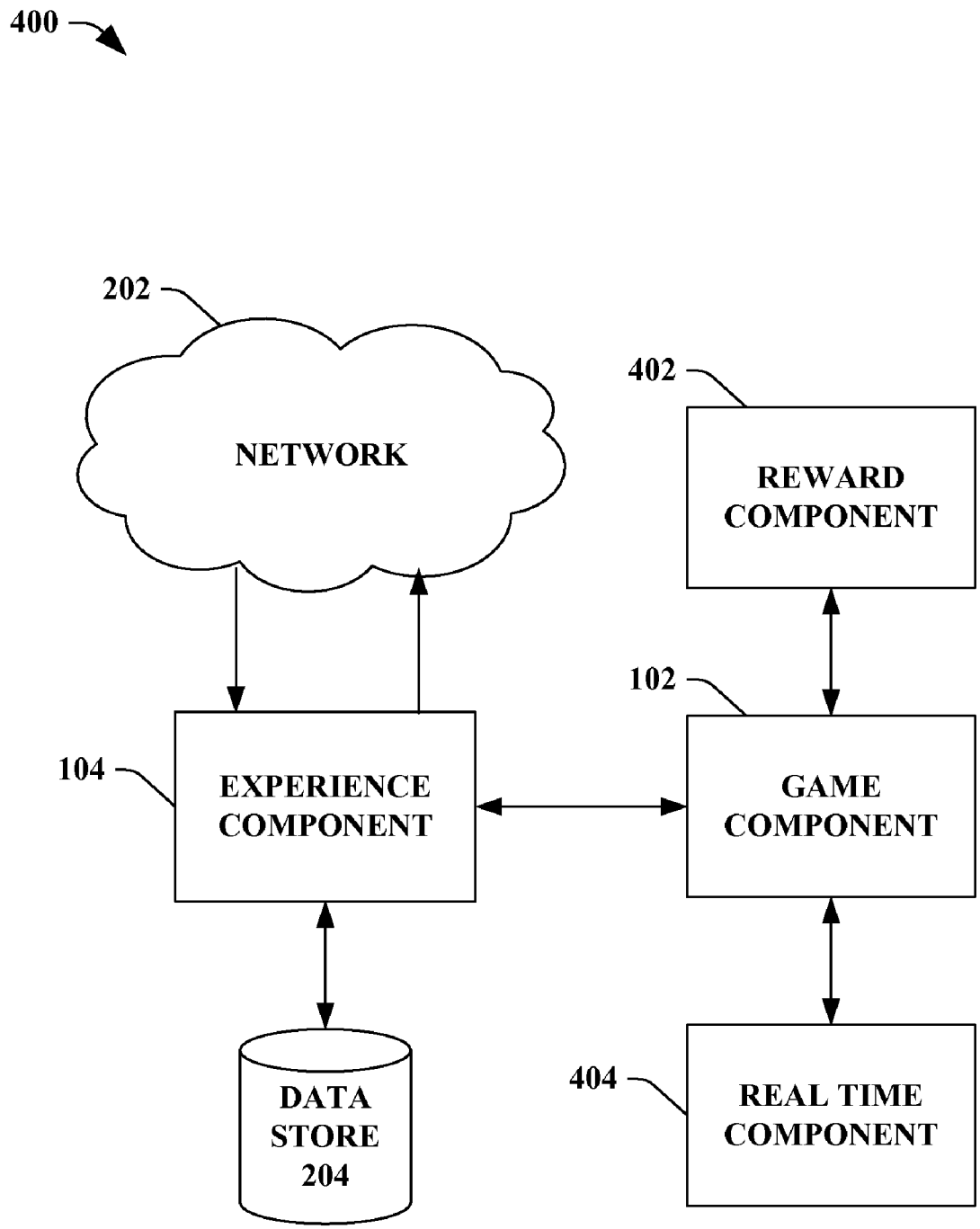
FIG. 4 illustrates a block diagram of an exemplary system that facilitates employing a dynamic and interactive experience with a game by leveraging a network.

FIG. 4 illustrates a system 400 that facilitates employing a dynamic and interactive experience with a game by leveraging a network. The system 400 can enhance conventional techniques associated with games by optimizing playability with dynamic tips, suggestions, alterations, nuances, advice, and the like. The system 400 can include the experience component 104 that can gather and/or collect a portion of data related to a specific instance in a game via the network 202. The game component 102 can detect such specific instance in the game and consequently dynamically incorporate such portion of data into the game or game play. In particular, the game component 102 can retrieve such portions of data from the data store 204, wherein the appropriate portions of data (e.g., appropriate in that such portions of data correlate to a point in the game) can be tagged and identified based upon game title, a point in the game, a scenario in the game, an instant in a story line for a game, and the like.

The system 400 can utilize reward component 402 that can supply an incentive to entice data contribution for a game. Thus, an entity (e.g., user, player, web site, web service, a third-party, a group, a company, a service, a forum, etc.) that contributes, donates, and/or provides portions of data to the network 202 can be rewarded or compensated by the reward component 402. For instance, a user can email a tip (e.g., a portion of data related to a game) and upon validation or authentication of at least one of the user or the tip, a reward can be credited to the user or an account related to such user. The reward component 402 can utilize any suitable reward to compensate contribution. For example, the reward can be money, a micro reward, a ranking increase, a credit for online game play, a currency associated with a game, a currency associated with a gaming device/console, an increase in skill level for a game, gift certificate, a web service, a portion of data/information, a subscription (e.g., Internet service, magazine, web site, etc.), and/or any service or item that can be represented with monetary value.

The game component 102 can further utilize a real time component 404 that can incorporate a real time event into a game to enhance playability. In general, the real time component 404 can identify real time events and seamlessly integrate such real time events into the game. For example, the real time event can be a news event, a political event, weather, sounds, patterns, and the like. Take for instance, a sports video game, in which a user/player in Cleveland, Ohio is playing. While playing the game, the weather can go from sunny to rainy. Such real time event can be incorporated into the game in that the weather can change from sunny to rainy. Moreover, if a player in real life is injured; such injury can be replicated in the game by the real time component 404. The real time component 404 can increase the involvement for users/players and a game with seamless incorporation of real time events.

Figure 5:
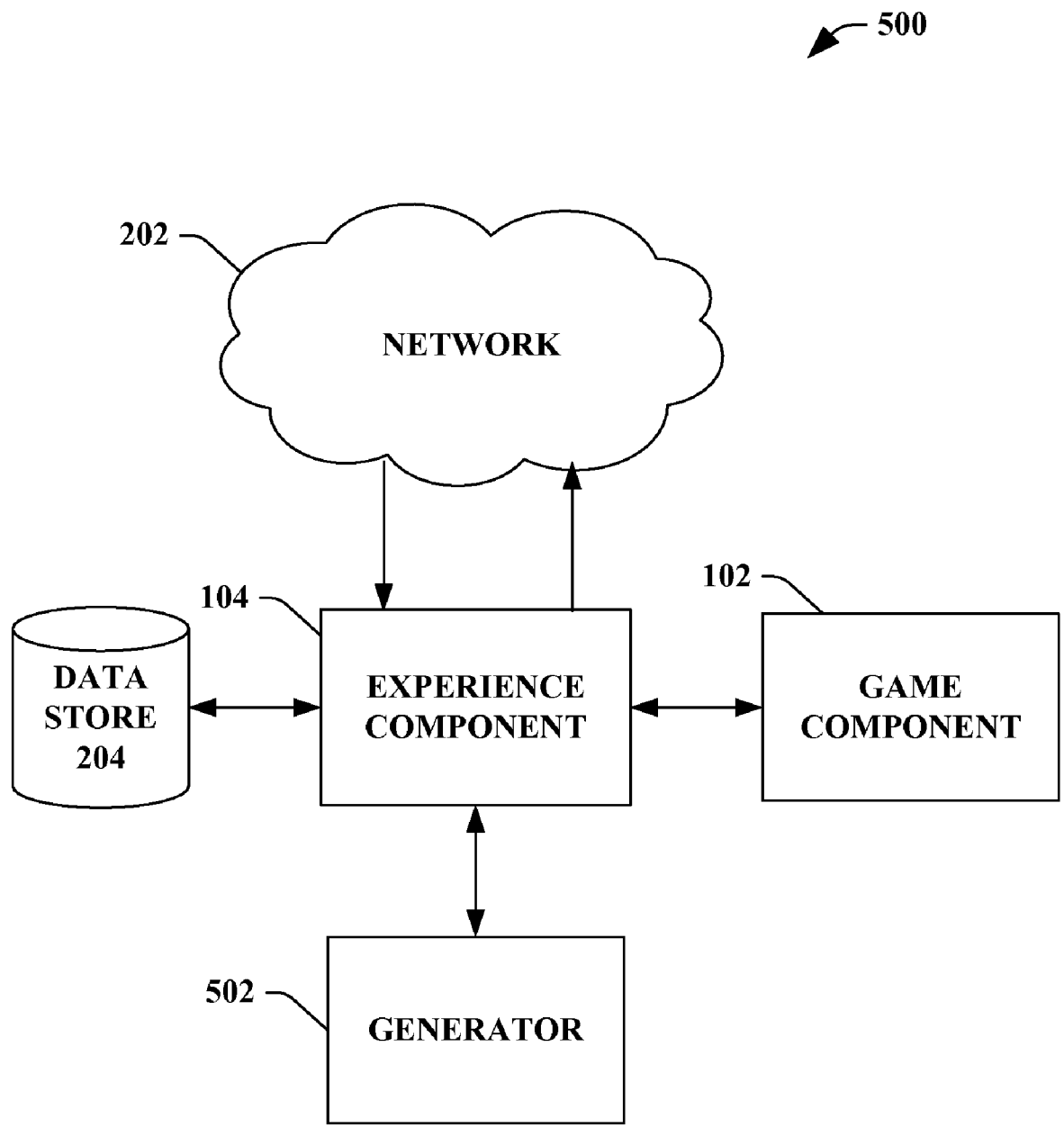
FIG. 5 illustrates a block diagram of exemplary system that facilitates assembling a second game utilizing suggestions, tips, collaborations, and the like from a network of data related to a first game.

FIG. 5 illustrates a system 500 that facilities assembling a second game utilizing suggestions, tips, collaborations, and the like from a network related to a first game. The system 500 can include the game component 102 that can seamlessly integrate a portion of data into a game during game play, wherein such portion of data can be collected by the experience component 104 via the network 202. The network 202 can include various sources of data such as users, web sites, forums, corporations, services, and the like. With such a diverse and rich source of information and data related to games, the system 500 can provide various portions of data to a user/player in real time game play.

The system 500 can include a generator 502 that can utilize the portions of data collected by the experience component 104 to create a game. The generator 502 can identify portions of data and assemble such portions of data for a game concept. It is to be appreciated that any portion of data related to a game can be aggregated to generate a new game regardless of the source (e.g., a user, a web site, a service, an email, a computer, a company, etc.) or for which game the data relates. For example, numerous suggestions related to various games can be aggregated to create a new game or a variation of a game. This new game or variation of a game can be distributed via the network 202 or at a physical location. In one specific example, contributors of information to the network 202 can be compensated by the reward component (not shown but discussed in FIG. 4) with the new game or the variation of a game.

Figure 6:
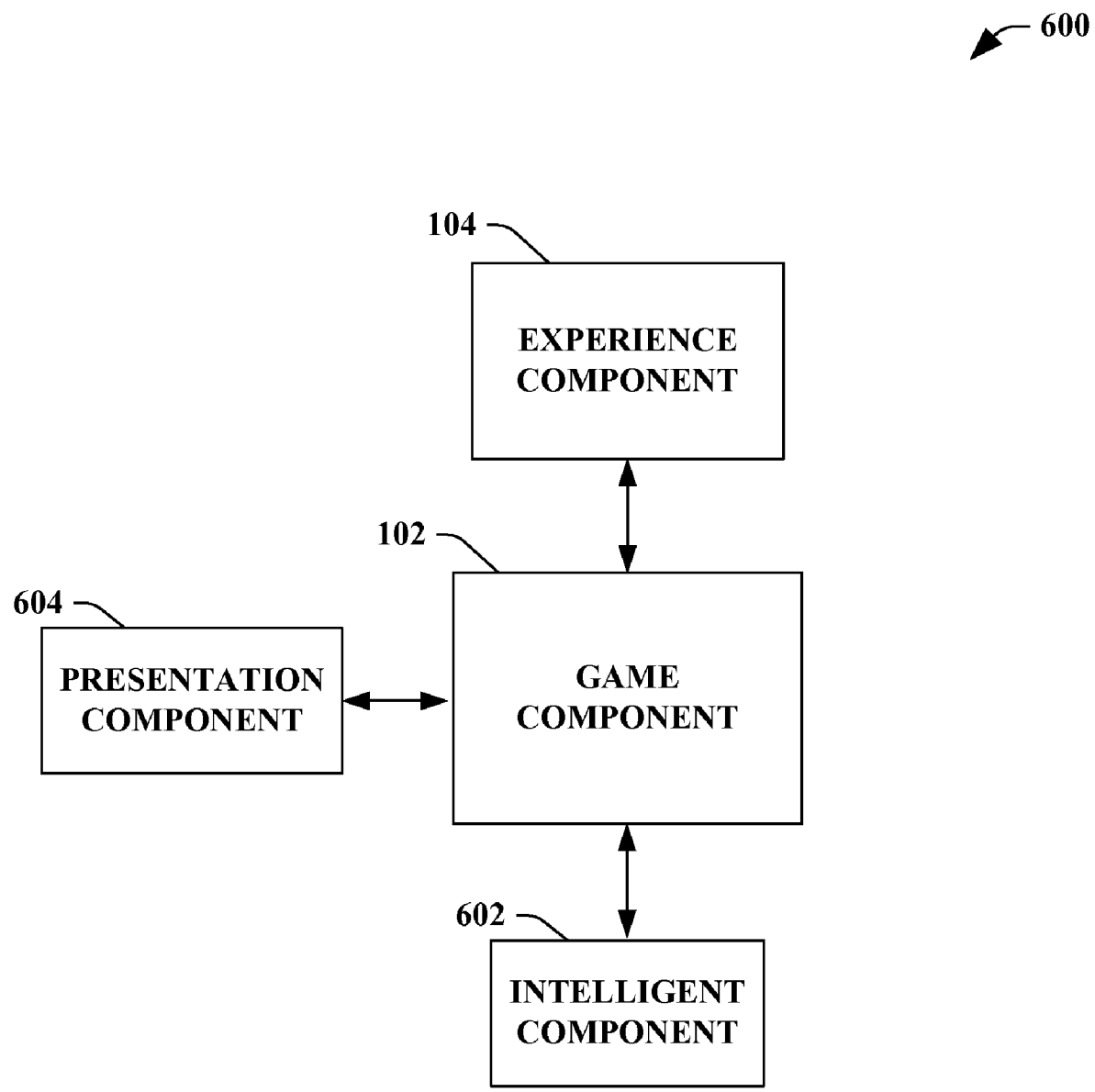
FIG. 6 illustrates a block diagram of an exemplary system that facilitates incorporating dynamic controls for a gaming outcome and/or future iterations of the game.

FIG. 6 illustrates a system 600 that employs intelligence to facilitate incorporating dynamic controls for a gaming outcome and/or future iterations of the game. The system 600 can include the game component 102 and the experience component 104. It is to be appreciated that the game component 102 and the experience component 104 can be substantially similar to respective components described in previous figures. The system 600 further includes an intelligent component 602. The intelligent component 602 can be utilized by the game component 102 to facilitate incorporating collected data into a game in real time for enhanced playability. For example, the intelligent component 602 can infer suggested outcomes, future game iterations, hints, tactics, nuances, alternative endings, suggestions, popularity of suggestions, incentive preference, user preferences, user settings, collaboration contribution, etc., which can be dynamically incorporated into the game during game play.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The game component 102 can further utilize a presentation component 604 that provides various types of user interfaces to facilitate interaction between a user and any component coupled to the game component 102. As depicted, the presentation component 604 is a separate entity that can be utilized with the game component 102. However, it is to be appreciated that the presentation component 604 and/or similar view components can be incorporated into the game component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the game component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
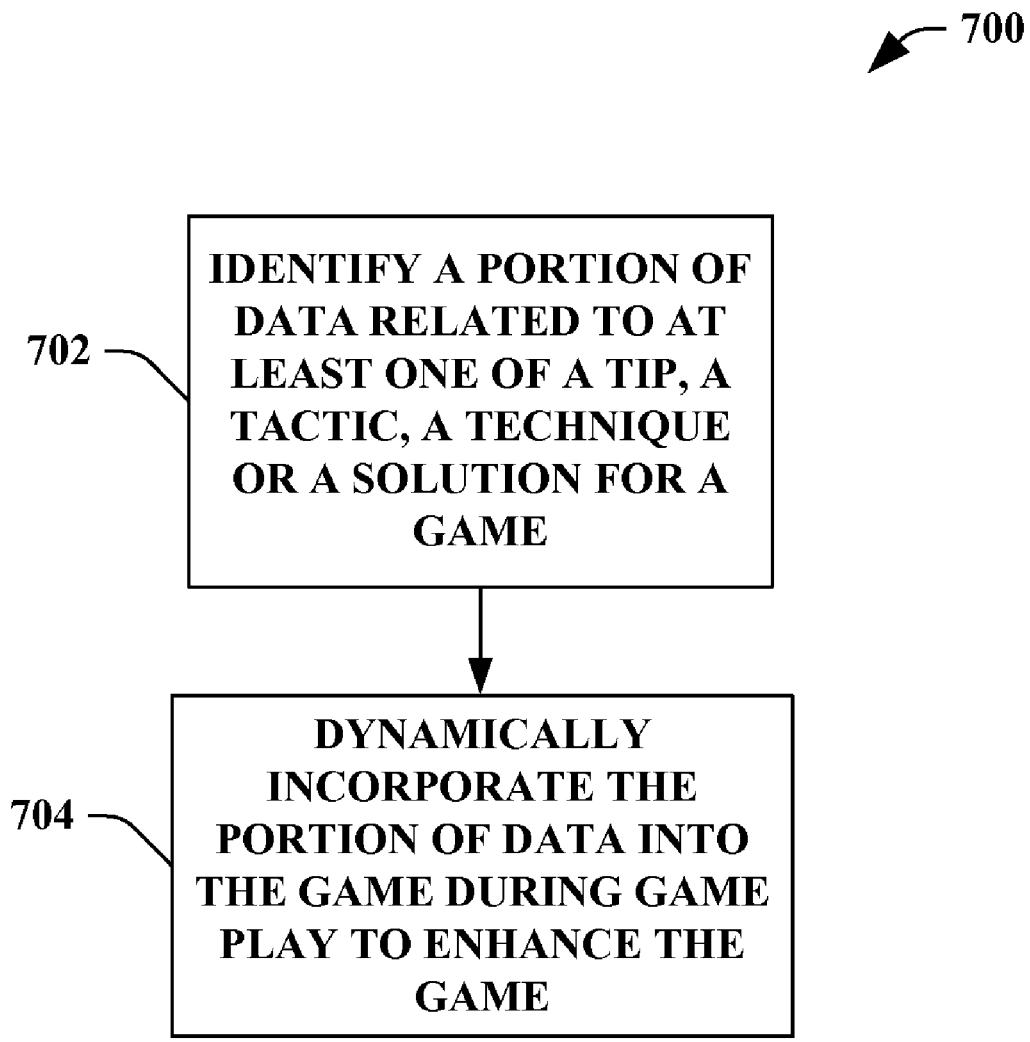
FIG. 7 illustrates an exemplary methodology for incorporating a portion of data into a game during game play to enhance playability.
Figure 8:
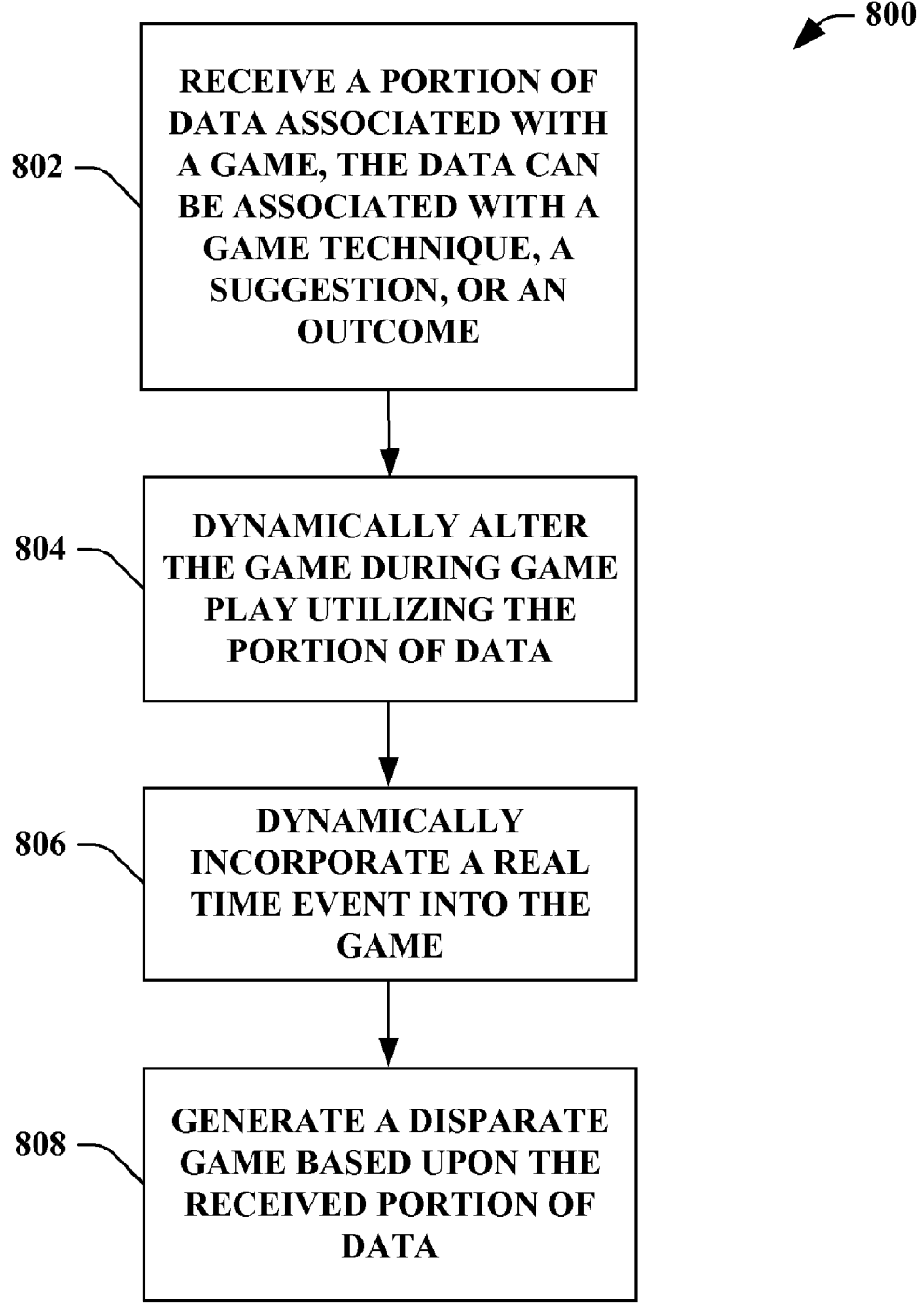
FIG. 8 illustrates an exemplary methodology that facilitates employing a dynamic and interactive experience with a game by leveraging a network.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates incorporating a portion of data into a game during game play to enhance playability. At reference numeral 702, a portion of data related to at least one of a tip, a tactic, a technique or a solution for a game can be identified. For example, it is to be appreciated and understood that the game can be at least one of a computer game, a video game, a personal computer game, a role-playing game, a virtual world game, a game associated with a genre (e.g., first person game, an action game, a racing game, a fighting game, a strategy game, a puzzle game, a board game, a card game, a sport game, etc.), a hand held game, a game related to a hand held device, and/or any suitable game with Internet capabilities to receive a portion of data. Generally, a game can be any interactive experience such as, but is not limited to, a competitive activity involving at least one of skill, chance, or endurance on the part of one or more individuals who play according to a set of rules, usually for their own amusement or for that of spectators.

At reference numeral 704, the portion of data can be dynamically incorporated into the game during game play to enhance such game. For example, the portion of data can be seamlessly integrated during game play at a particular point in the game, wherein such portion of data can correspond to the particular point. In another example, a trigger to incorporate data can be set with pre-defined thresholds such as time duration, a point in a game, a skill-level, etc. Moreover, the portion of data integrated into the game during game play can correspond to a user's skill level. For example, a user with a high skill level for a game typically desires high level techniques, tactics, tips, or solutions. Conversely, a user with a low skill level for a game may not be capable of performing tips, tactics, techniques, or solutions unless they are low level.

FIG. 8 illustrates a method 800 for employing a dynamic and interactive experience with a game by leveraging a network. At reference numeral 802, a portion of data associated with a game can be received, wherein the data can be associated with a game technique, a suggestion, or an outcome. It is to be appreciated that any suitable technique, suggestion, or outcome related to a game can be received. For instance, the data can be received via a network, wherein the network can be the Internet, a web site, a forum, an email, a web service, a voice over Internet protocol (VoIP) communication, an instant message, a text message, a cellular communication, a voicemail, a computer, a machine, a laptop, a user, a community of users, a portable digital assistant (PDA), a hand held, etc.

At reference numeral 804, the game can be dynamically altered during game play utilizing the portion of data. It is to be appreciated that the alteration from the portion of data can be any suitable change to a game or game play. For example, the alteration can relate to any suitable portion of the game such as, but not limited to, a story line, a character, a rule, a setting, equipment, a control, a difficulty setting, an environment, offline play, game play, online play, network capabilities, a game mode, a portion of graphics, a portion of audio, a portion of video, a portion of user interaction, etc.

At reference numeral 806, a real time event can be seamlessly and dynamically incorporated into the game. In other words, a real time event associated with the real world can be replicated and integrated into a game during game play. For example, the real time event can be a news event, a political event, weather, sounds, patterns, and the like. At reference numeral 808, a disparate game can be generated based upon a portion of the received data. It is to be appreciated that the disparate game can be a new game in comparison to the game in which information is received or a variation of a game. For example, suggestions or outcomes corresponding to game A and game B, wherein such information can be aggregated to create a new game C.

Figure 9:
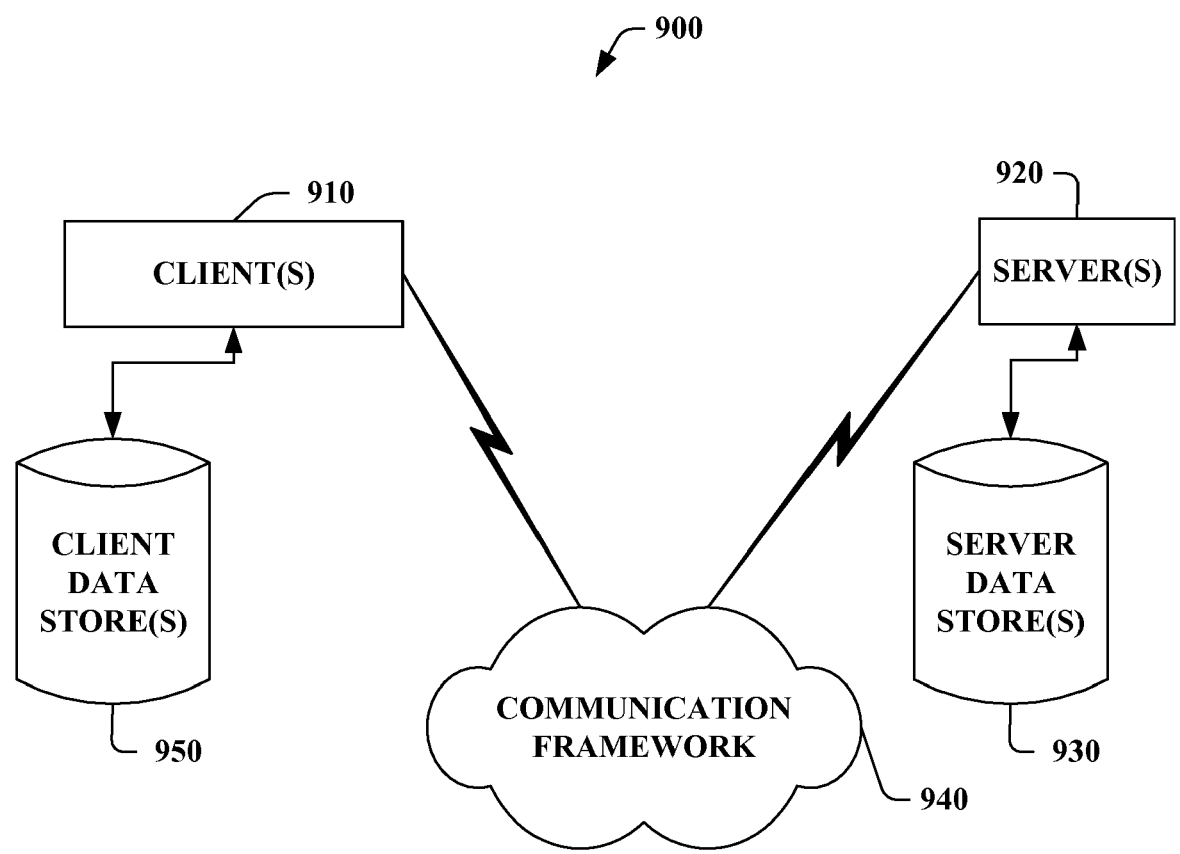
FIG. 9 illustrates an exemplary networking environment, wherein the novel aspects of the claimed subject matter can be employed.
Figure 10:
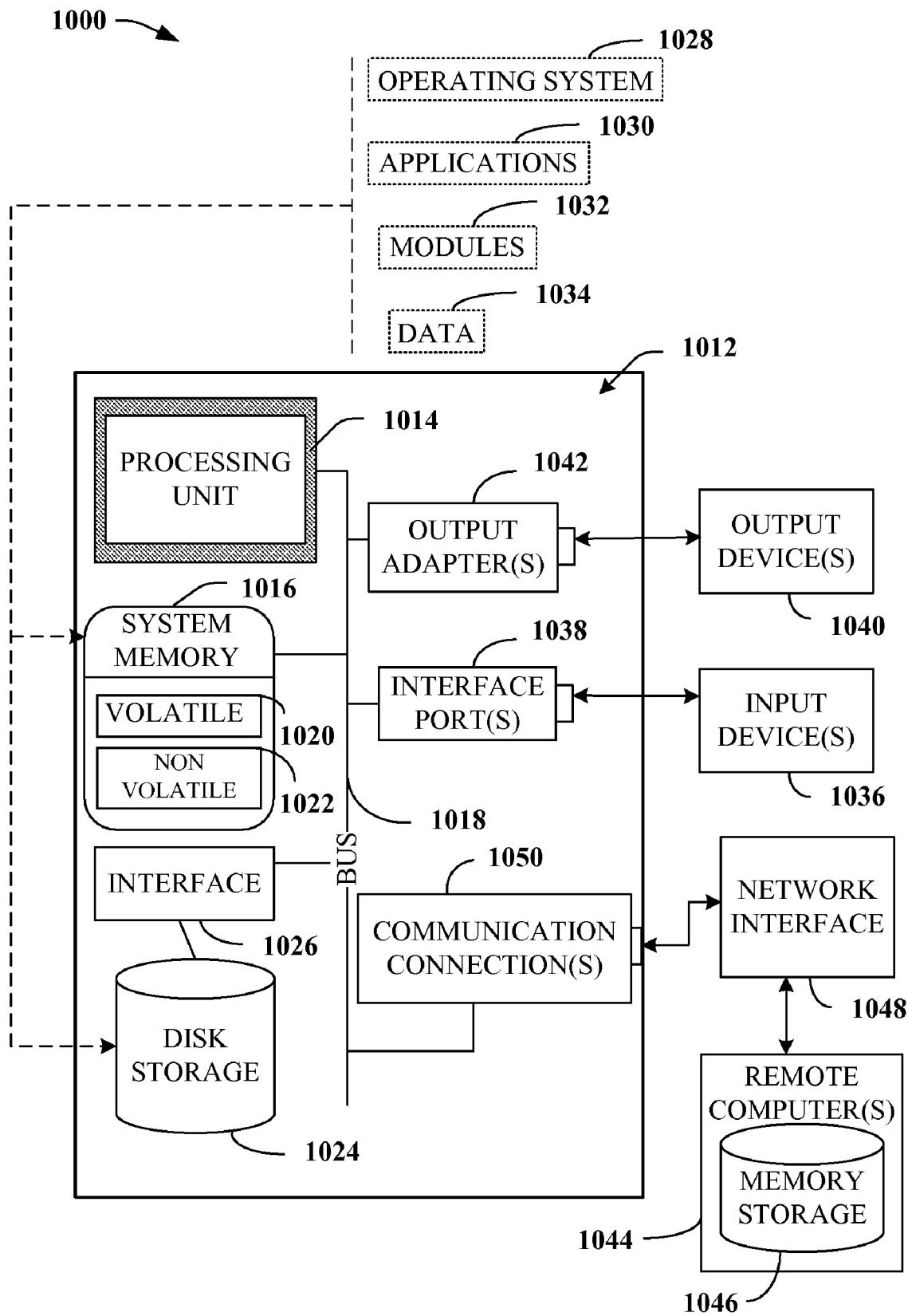
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a game component that facilitates enhancing a game with a tip or tactic in real time during game play, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates enhancing a game, comprising:
an experience component that collects a portion of data related to a game having multiple game levels, the portion of data indicates at least one of a tip or a tactic for the game, the portion of data being independent of a current instance of game play of the game by a user;
a game component that dynamically incorporates the portion of data into the game during the current instance of game play to enhance playability of such game for the user with assistance provided by at least one of the tip or the tactic; and
an alteration component that alters, during the current instance of game play, a level of the game based at least upon the portion of data.

2. The system of claim 1, the game is an interactive experience and a competitive activity involving at least one of skill, chance, or endurance on behalf of one or more users who play according to at least one rule.

3. The system of claim 2, the game is at least one of a computer game, a video game, a personal computer game, a role-playing game, a virtual world game, a game associated with a genre, a first person game, an action game, a racing game, a fighting game, a strategy game, a puzzle game, a board game, a card game, a sport game, a hand held game, a game related to a hand held device, or a game with Internet capabilities to receive the portion of data.

4. The system of claim 1, the portion of data corresponds to a particular instant in the game and the game component incorporates the portion of data into the game when the user encounters such particular instant.

5. The system of claim 1, further comprising a network that provides the portion of data to at least one of the experience component or the game component, the network is at least one of the Internet, a web site, a forum, an email, a web service, a voice over Internet protocol (VoIP) communication, an instant message, a text message, a cellular communication, a voicemail, a computer, a machine, a laptop, a user, a community of users, a portable digital assistant (PDA), a data communication from a user, or a hand held.

6. The system of claim 1, the portion of data is at least one of a past experience in the game, a past situation in the game, a game suggestion, a game nuance, a game technique, a solution to the game, or a portion of advice for interacting with the game.

7. The system of claim 1, the alteration component configured to employ an alteration to the game based upon the portion of data, the portion of data is at least one of a past experience in the game, a past situation in the game, a game suggestion, a game nuance, a game technique, a solution to the game, or a portion of advice for interacting with the game.

8. The system of claim 7, the alteration affects at least one of a game story line, a character associated with the game, a rule within the game, a game setting, equipment within the game, a control the game, a difficulty setting within the game, an environment for the game, offline play associated with the game, the game's game play, online play associated with the game, a game network capability, a game mode, a portion of graphics related to the game, a portion of audio related to the game, a portion of video related to the game, or a portion of user interaction within the game.

9. The system of claim 1, further comprising:
a verification module that verifies at least one of validity or accuracy of the portion of data.

10. The system of claim 1, wherein the portion of data corresponds to a previous instance of game play of the game.

11. The system of claim 1, wherein the portion of data corresponds to information related to an instance of game play of the game by another user.

12. The system of claim 1, further comprising a tolerance component that employs a trigger associated with the user to initiate dynamic incorporation of the portion of data.

13. The system of claim 12, the trigger is based upon at least one of a duration related to a particular instant, a time period a user is unable to succeed at a point in a game, a skill level related to a user, a duration associated with total game play, a total time a user has played the game, a rating of the portion of data, or a difficulty level related to a point in the game.

14. The system of claim 1, further comprising a reward component that supplies compensation to an entity that contributes a portion of data that is gathered by the experience component.

15. The system of claim 14, the compensation is at least one of money, a micro reward, a ranking increase, a credit for online game play, a currency associated with a game, a currency associated with a gaming device, a currency associated with a gaming console, an increase in skill level for a game, a gift certificate, a web service, a portion of information, or a subscription.

16. The system of claim 1, further comprising a real time component that identifies a real time event and seamlessly integrates such real time event into the game.

17. The system of claim 16, the real time event is at least one of a news event, a political event, weather, a sound, or a pattern.

18. The system of claim 1, further comprising a generator that aggregate the portion of data related to the game to create at least one of a disparate game or a variation of the game, the portion of data is at least one of a past experience in a game, a past situation in a game, a game suggestion, a game nuance, a game technique, a solution to a game, a review for a game, or a portion of advice for interacting with a game.

19. A computer-implemented method that facilitates incorporating a portion of data into a game for improved game play, comprising:
identifying a portion of data related to at least one of a tip, a tactic, a technique or a solution for a game having multiple game levels, the portion of data being independent of a current instance of game play of the game;
dynamically incorporating the portion of data into the game during the current instance of game play to improve playability; and
altering a level of the game based at least in part on the portion of data during the current instance of game play of the game.

20. The method of claim 19, further comprising:
dynamically incorporating a real time event into the game; and
generating a disparate game based at least in part upon the portion of data.

21. The method of claim 19, further comprising incorporating the portion of data into the game when a user encounters a particular instant, the portion of data corresponds to such particular instant in the game.

22. The method of claim 19, further comprising verifying at least one of validity and accuracy of the portion of data.

23. The method of claim 19, wherein the portion of data corresponds to a previous instance of game play of the game.

24. The method of claim 19, wherein a first user plays the game during the current instance of game play, and wherein the portion of data corresponds to information related to an instance of game play of the game by a second user.

25. A computer-implemented system that facilitates enhancing a game, comprising:
means for collecting a portion of data related to a game having multiple game levels, the portion of data indicates at least one of a tip or a tactic for the game, the portion of data being independent of a current instance of game play of the game;
means for dynamically incorporating the portion of data into the game during the current instance of game play to enhance playability of such game for a user with assistance provided by at least one of the tip or the tactic; and
means for dynamically altering a level of the game based at least in part on the portion of data during the current instance of game play of the game.

26. The computer-implemented system of claim 25, further comprising:
verification means for verifying at least one of validity or accuracy of the portion of data.

* * * * *